US009920797B2

United States Patent
Kuss et al.

(10) Patent No.: US 9,920,797 B2
(45) Date of Patent: Mar. 20, 2018

(54) METHOD FOR AVOIDING SAFETY-CRITICAL ACTIVATION OF A CLUTCH IN A HYBRID MODULE OF A DRIVETRAIN OF A MOTOR VEHICLE

(71) Applicant: Schaeffler Technologies AG & Co. KG, Herzogenaurach (DE)

(72) Inventors: Volker Kuss, Kappelrodeck (DE); Martin Dilzer, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/024,533

(22) PCT Filed: Sep. 23, 2014

(86) PCT No.: PCT/DE2014/200495
§ 371 (c)(1),
(2) Date: Mar. 24, 2016

(87) PCT Pub. No.: WO2015/043596
PCT Pub. Date: Apr. 2, 2015

(65) Prior Publication Data
US 2016/0215832 A1    Jul. 28, 2016

(30) Foreign Application Priority Data
Sep. 25, 2013    (DE) .................. 10 2013 219 216

(51) Int. Cl.
*F16D 48/10* (2006.01)
*B60W 10/02* (2006.01)
(Continued)

(52) U.S. Cl.
CPC ............... *F16D 48/10* (2013.01); *B60K 6/26* (2013.01); *B60K 6/387* (2013.01); *B60K 6/442* (2013.01);
(Continued)

(58) Field of Classification Search
CPC ........... F16D 48/10; B60K 6/38; B60K 6/383; B60K 6/387; B60K 2006/268; B60K 28/165; B60W 10/02; B60W 20/40
See application file for complete search history.

(56) References Cited

U.S. PATENT DOCUMENTS 4,729,462 A * 3/1988 Braun ..................... F16D 25/14
192/103 F
5,277,286 A * 1/1994 Yamamoto ........ B60W 30/1819
188/DIG. 1
(Continued)

FOREIGN PATENT DOCUMENTS

DE        19939442 A1 *  2/2001  ........... B60K 28/165
DE    102005024359 A1 * 11/2006  ............. B60K 6/387
(Continued)

OTHER PUBLICATIONS

EPO machine translation of DE 102009002805 (original DE document published Nov. 11, 2010).*

*Primary Examiner* — Behrang Badii
*Assistant Examiner* — David A Testardi
(74) *Attorney, Agent, or Firm* — Volpe and Koenig, P.C.

(57) ABSTRACT

The invention relates to a method for avoiding safety-critical activation of a clutch in a hybrid module of a drivetrain of a motor vehicle, wherein the hybrid module is effective between the internal combustion engine and the transmission and has an electric drive, the clutch and a freewheel, and the clutch is used to start the internal combustion engine by transmitting a torque, supplied by the electric drive or the drivetrain, by a frictionally locking connection to the electric drive or the drivetrain, or for disconnecting the internal combustion engine from the drivetrain for purely electric driving. In a method for avoiding safety-critical activation of a clutch in a hybrid module in which safety-critical driving situations are reliably prevented, a critical interference (Continued)

Figure 1:
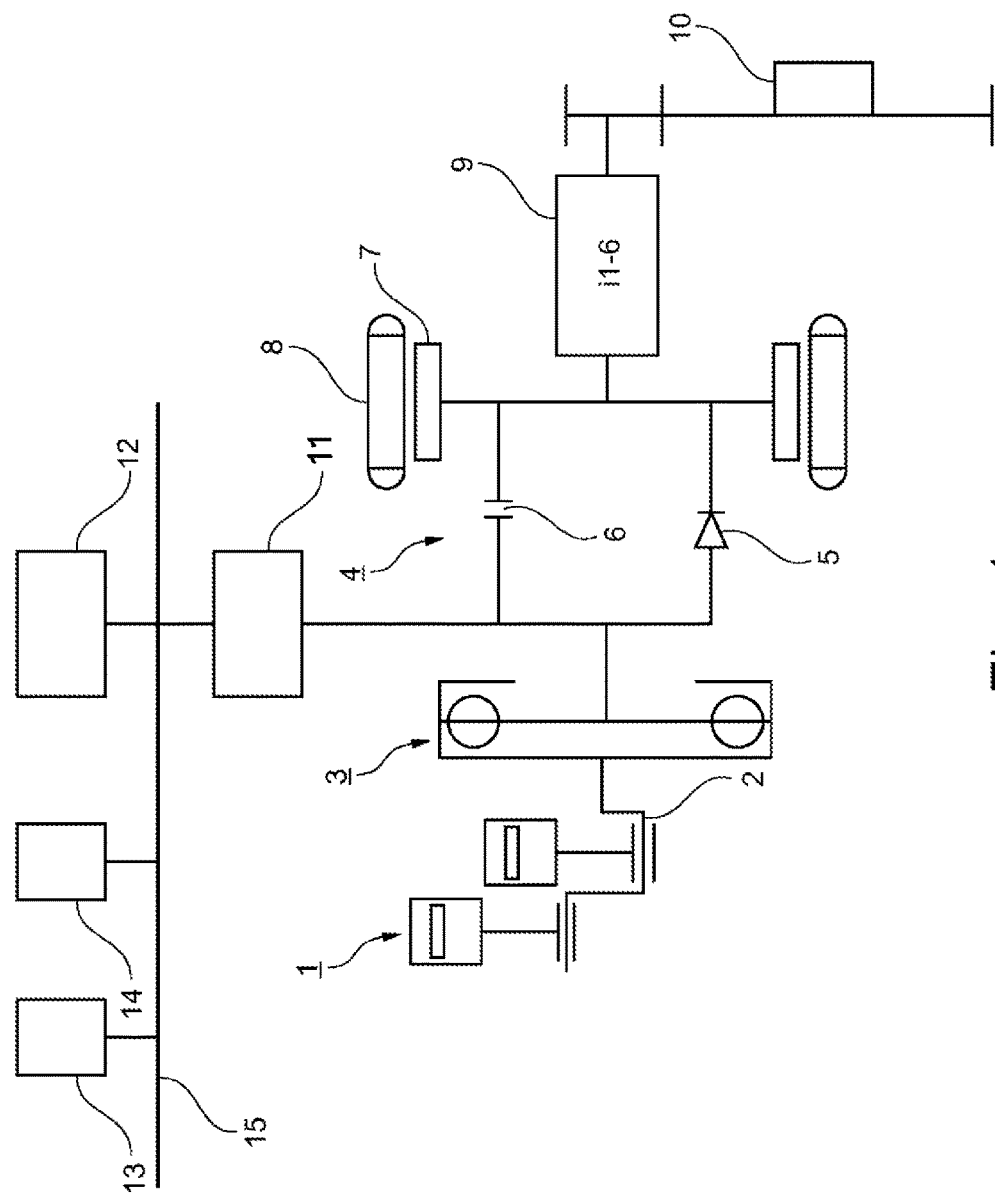

torque of the clutch is set as a function of ambient conditions of the motor vehicle and/or peripheral conditions of the vehicle, in order to set a safety distance to be maintained by the open clutch.

8 Claims, 2 Drawing Sheets

(51) Int. Cl.
*B60W 20/40* (2016.01)
*B60K 28/16* (2006.01)
*F16D 48/06* (2006.01)
*B60K 6/48* (2007.10)
*B60W 10/06* (2006.01)
*B60W 10/08* (2006.01)
*B60W 20/15* (2016.01)
*B60K 6/26* (2007.10)
*B60K 6/387* (2007.10)
*B60K 6/442* (2007.10)

(52) U.S. Cl.
CPC .............. *B60K 6/48* (2013.01); *B60K 28/165* (2013.01); *B60W 10/02* (2013.01); *B60W 10/06* (2013.01); *B60W 10/08* (2013.01); *B60W 20/15* (2016.01); *B60W 20/40* (2013.01); *F16D 48/06* (2013.01); *B60K 2006/268* (2013.01); *B60K 2006/4825* (2013.01); *B60W 2510/1005* (2013.01); *B60W 2520/10* (2013.01); *B60W 2520/125* (2013.01); *B60W 2550/148* (2013.01); *B60W 2710/027* (2013.01); *B60Y 2200/92* (2013.01); *B60Y 2300/182* (2013.01); *B60Y 2300/42* (2013.01); *B60Y 2300/63* (2013.01); *B60Y 2400/424* (2013.01); *F16D 2500/1066* (2013.01); *F16D 2500/10412* (2013.01); *F16D 2500/312* (2013.01); *F16D 2500/3109* (2013.01); *F16D 2500/3122* (2013.01); *F16D 2500/3125* (2013.01); *F16D 2500/5029* (2013.01); *F16D 2500/5104* (2013.01); *F16D 2500/5114* (2013.01); *F16D 2500/702* (2013.01); *Y02T 10/6221* (2013.01); *Y02T 10/6252* (2013.01); *Y02T 10/6286* (2013.01); *Y10S 903/914* (2013.01); *Y10S 903/946* (2013.01)

(56) References Cited

U.S. PATENT DOCUMENTS

| | | | |
|---|---|---|---|
| 6,029,511 A * | 2/2000 | Welsch | B60K 28/165 180/338 |
| 6,250,448 B1 * | 6/2001 | Salecker | B60K 28/165 192/103 F |
| 8,762,017 B2 * | 6/2014 | Juhlin-Dannfelt | F16D 48/06 701/68 |
| 2002/0025882 A1 * | 2/2002 | Schmitt | B60K 28/165 477/83 |
| 2009/0255743 A1 * | 10/2009 | Dilzer | B60K 6/48 180/65.265 |
| 2010/0318251 A1 | 12/2010 | Amann et al. | |
| 2013/0211653 A1 * | 8/2013 | Matsui | F02D 41/123 701/22 |
| 2013/0296132 A1 * | 11/2013 | Doering | B60K 6/48 477/86 |
| 2013/0297122 A1 * | 11/2013 | Gibson | B60W 20/40 701/22 |
| 2014/0067219 A1 * | 3/2014 | Stares | B60K 17/34 701/69 |
| 2014/0303822 A1 * | 10/2014 | Kawamura | B60K 6/48 701/22 |
| 2015/0105959 A1 * | 4/2015 | Schnappauf | B60T 8/1755 701/22 |

FOREIGN PATENT DOCUMENTS

| | | | | |
|---|---|---|---|---|
| DE | 102007050775 | | 4/2009 | |
| DE | 102009043243 | | 5/2010 | |
| DE | 102009002805 | A1 * | 11/2010 | |
| DE | 102012206680 | | 11/2012 | |
| EP | 724978 | A1 * | 8/1996 | |
| EP | 2034223 | | 3/2009 | |
| JP | 10089383 | A * | 4/1998 | .......... B60K 28/165 |
| JP | 11173348 | A * | 6/1999 | |
| JP | 2010038176 | A * | 2/2010 | |

* cited by examiner

METHOD FOR AVOIDING SAFETY-CRITICAL ACTIVATION OF A CLUTCH IN A HYBRID MODULE OF A DRIVETRAIN OF A MOTOR VEHICLE

BACKGROUND

The invention relates to a method for avoiding safety-critical activation of a clutch in a hybrid module of a drivetrain of a motor vehicle, wherein the hybrid module is effective between the internal combustion engine and the transmission and has an electric drive, the clutch and a freewheel, and the clutch is used to start the internal combustion engine by transmitting a torque, supplied by the electric drive or the drivetrain, by a frictionally locking connection to the electric drive or the drivetrain or to decouple the internal combustion engine from the drivetrain for purely electric travel.

DE 10 2012 206 680 A1 discloses a hybrid module for a drivetrain of a vehicle. The hybrid module is arranged between the internal combustion engine and the transmission and has an electric drive, a clutch and a freewheel, wherein the clutch and the freewheel are each provided in parallel with one another in order to transmit torque from the internal combustion engine in the direction of the transmission. The freewheel transmits the torque from the internal combustion engine in the direction of the transmission and opens given a torque directed in the opposite direction, with the result that the vehicle can be driven optionally by the internal combustion engine or the electric drive or at the same time by both in combination. The clutch has thereby the tasks of starting the internal combustion engine by transmitting the torque supplied by the electric drive or the drivetrain, by connecting the internal combustion engine and the electric drive or the drivetrain in a frictionally locking fashion, or of decoupling the internal combustion engine from the drivetrain in order to operate the motor vehicle in a purely electrical fashion or in order to transmit the traction torque and thrust torque of the internal combustion engine in the hybrid travel mode.

Changing over from the electric travel mode to the hybrid travel mode therefore requires the clutch to be closed in order to start the internal combustion engine. In particular, in the case of starting or restarting using the kinetic energy of the rotating drivetrain, the closing of the clutch and the associated acceleration of the immobile internal combustion engine result in a corresponding torque which will be referred to below as interference torque. This interference torque can, under specific ambient influences, lead to safety-critical scenarios of the motor vehicle.

SUMMARY

The invention is therefore based on the object of specifying a method for avoiding safety-critical activation of a clutch in a hybrid module of a motor vehicle.

According to the invention, the object is achieved in that a critical interference torque of the clutch is set in order to set a safety distance which is to be maintained by the open clutch as a function of ambient conditions of the motor vehicle and/or peripheral conditions of the vehicle. The safety distance of the open clutch is intended to be understood here as the distance between the frictional linings taking into account the disengagement travel when the clutch is open. Under poor ambient conditions, the safety distance is larger as a result of lower tolerable interference torques, whereas under better ambient conditions the safety distance is to be set to a smaller value due to larger tolerable interference torques. Due to this indirect relationship between the interference torque and the safety distance, the maximum possible system dynamics and safety is ensured in each situation of the travel mode of the motor vehicle. In this case, the motor vehicle system does not necessarily have to be generally operated in an excessively safe range which covers all conceivable cases, but it nevertheless offers the best possible system dynamics, system availability and system safety.

The critical interference torque is advantageously determined as a function of a coefficient of friction of the vehicle wheels. In particular, in the case of an underlying surface which is wet from rain or in the case of ice on the surface, the coefficient of friction changes so that the interference torque is changed as a function of different coefficients of friction, in order to prevent safety-critical activation of the clutch, since a differentiated transmission of force of the tires to the underlying surface occurs.

In one refinement, the coefficient of friction is formed as a constant for a range of an external temperature of the motor vehicle. In this context, a coefficient of friction may be defined, for example for an external temperature <3° C. and an external temperature of >3° C., in order to classify the transmission of force between the tires and the underlying surface.

In one variant, the critical interference torque is determined as a function of a lateral acceleration of the motor vehicle. In this context, in particular during cornering at a constant velocity, the dependence of the tolerable interference torque on the variables of the coefficient of friction of the road, transmission ratio and velocity or the lateral acceleration associated therewith is taken into account in order to ensure the safety of the vehicle.

In one development, when the critical interference torque is exceeded by the predefined torque, vehicle movement dynamic measures for reducing the critical interference torque are initiated in order to ensure the safety of the vehicle. With respect to such vehicle movement dynamic measures, these can be, for example, engagement of a higher gear speed or the disconnection of the drivetrain from the internal combustion engine before the internal combustion engine starts or avoidance of the starting of the internal combustion engine after a lateral acceleration limit to be defined is undershot.

In one refinement, information about the ambient conditions and/or the peripheral conditions of the vehicle is made available via a communication line of the motor vehicle. As a result, the data which is made available by sensors which are present per se in the motor vehicle is also used to prevent safety-critical activation of the clutch.

The safety distance of the open clutch is advantageously set with knowledge of a clutch characteristic curve taking into account the information about the ambient conditions and/or the peripheral conditions of the vehicle. By including the clutch characteristic curve, clutch dynamics which occur in the event of a fault are taken into account, which improves the accuracy of the safe distance which is to be set.

BRIEF DESCRIPTION OF THE PREFERRED EMBODIMENTS

Figure 2:
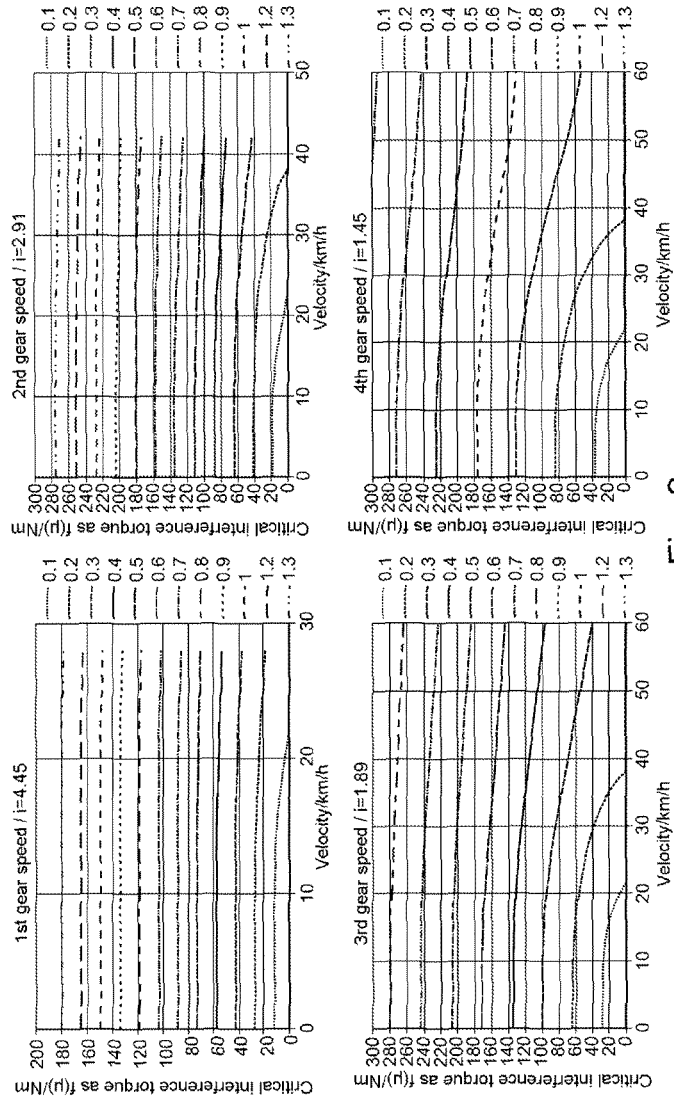

The invention relates to numerous embodiments. One of these will be explained in more detail on the basis of the figures illustrated in the drawing, in which:

FIG. 1 shows a schematic illustration of a drivetrain of a motor vehicle having a hybrid module, FIG. 2 shows an overview of critical interference torques as a function of the friction, the gear speed and the speed of the vehicle.

DETAILED DESCRIPTION OF THE PREFERRED EMBODIMENTS

FIG. 1 is a schematic view of a drivetrain of a motor vehicle having an internal combustion engine 1, an oscillation damper 3 which is connected to a crankshaft 2 of the internal combustion engine 1, a hybrid module 4 with a freewheel 5 and a clutch 6, and with a rotor 7 and stator 8 of an electric drive, a transmission 9, a differential 10 and wheels which are not illustrated individually. Two parallel torque transmission paths are provided between the internal combustion engine 1 and the transmission 9. A first torque transmission path contains the clutch 6 and a second torque transmission path contains the freewheel 5. The freewheel 5 transmits to the transmission 9 when torque is being transmitted from the internal combustion engine 1, and opens when there is a direction of flow of the torque from the transmission 9 to the internal combustion engine 1. Torques from the transmission 9 in the direction of the internal combustion engine 1 can be transmitted when the clutch is closed. This relates, in particular, to the starting of the internal combustion engine 1 from electric driving and the transmission of the thrust torque in the case of a fully charged battery. In the internal-combustion-engine mode of the drivetrain, the clutch 6 remains closed, with the result that, according to its present torque transmission capacity, said clutch respectively transmits proportionally together with the freewheel the torque which can be transmitted by the internal combustion engine 1. The function of the clutch 6 is controlled here by a control device 11 which is connected to a superordinate vehicle control device 12. The control device 11 and the vehicle control device 12 are connected here to one another and to the sensors 13 and to the driver assistance system 14 via a vehicle communication line, preferably a CAN bus 15.

FIG. 2 illustrates an overview of the critical interference torques as a function of the coefficient of friction, the gear speed and the vehicle speed. As is apparent from FIG. 2, the vehicle travel through a bend in the second gear speed at 30 km/h under snow or an icy underlying surface (assumption of the coefficient of friction $\mu=0.3$), interference torques of >55 Nm can already give rise to possible safety-critical loss of adhesion between the tires and the underlying surface at the drive shaft. In order to prevent such critical situations of the motor vehicle, the control device 11 actuates the clutch 6 in such a way that a predefined safety distance of the open clutch is determined as a function of the ambient conditions or of peripheral conditions of the vehicle. In order to set this safety distance, a critical interference torque $M_{crit}$ is determined, which is done as follows:

$$M_{crit} = m_V * \frac{r_{dyn}}{i_{gear\ speed} * i_{Diff}} * \sqrt{(g*\mu)^2 - \left(\frac{v^2}{r}\right)^2} + M_{E-machine}$$

a. where
b. $\mu$: coefficient of friction
c. $v^2/r$: lateral acceleration
d. $m_v$: mass of the vehicle (kg)
e. $r_{dyn}$: dynamic rolling radius of the tire (m)
f. $i_{gear\ speed}$: ratio of the gear which is currently engaged
g. $i_{Diff}$: ratio of the differential gear
h. $M_{E-Machine}$: actual torque currently supplied by the electrical motor/electrical engine (Nm).

Depending on additionally detected information, for example the possible risk of ice on the road, given an external temperature <3° C. and/or lateral acceleration which is measured by the vehicle assistance system 14, the critical interference torque $M_{crit}$ is set as a function of these ambient conditions or peripheral conditions of the vehicle correspondingly. If the predefined torque request of the superordinate vehicle control device 12 exceeds the determined critical interference torque $M_{crit}$, measures to stabilize the travel mode are taken, such as shifting up into a higher gear speed or disconnecting the drivetrain from the internal combustion engine 1 or avoiding the starting of the internal combustion engine 1 until after a lateral acceleration limit to be defined is undershot. As a result, safety-critical driving states are prevented. Likewise, in the case of straight travel, that is to say virtually lateral-force-free travel, the starting of the internal combustion engine 1 can be carried out as a function of the temperature, in order to avoid safety-relevant wheel slip. Without the influence of the lateral force, the critical interference torques $M_{crit}$ are then formed as a function of the coefficient of friction or the engaged gear speed and as horizontal lines virtually independently of the velocity (FIG. 2).

Given an underlying surface which is wet with rain, the coefficient of friction $\mu$ is increased to approximately 0.7, which permits tolerable interference torques up to approximately 150 Nm. Taking into account the coupling dynamics which occur in the event of a fault, a necessary safety distance, to be maintained, of the open clutch 6 can be defined as a function of the required fault tolerance time. Given poorer ambient conditions, the safety distance must therefore be increased by the smaller tolerable interference torques. This fact results in different safety distances which are dependent on the ambient conditions and serve, on the one hand, to promote the functional safety as well as the possible availability of the system. Given knowledge of the clutch characteristic curve, the safety distance can be defined as a function of further detected information (for example possible smoothness temperature) at an external temperature <3° C. and/or the lateral acceleration which is measured by existing driver assistance systems, in combination with the fault tolerance time which is dependent on the entire system.

LIST OF REFERENCE NUMBERS

1 Internal combustion engine
2 Crankshaft
3 Oscillation damper
4 Hybrid module
5 Freewheel
6 Clutch
7 Rotor
8 Stator
9 Transmission
10 Differential
11 Control device
12 Vehicle control device
13 Sensor
14 Driver assistance system
15 CAN bus

The invention claimed is:
1. A method for avoiding safety-critical activation of a clutch in a hybrid module of a drivetrain of a motor vehicle, wherein the hybrid module is effective between the internal combustion engine and a transmission and has an electric drive, a clutch, and a freewheel, the clutch and the freewheel being arranged between the internal combustion engine and the electric drive, the method comprising:

using the clutch to start the internal combustion engine by transmitting a torque, supplied by the electric drive or the drivetrain, by a frictionally locking connection to the electric drive or the drivetrain or to decouple the internal combustion engine from the drivetrain for purely electric travel, and via a control device, setting a critical interference torque ($M_{crit}$) associated with a closing of the clutch in order to set a safety distance which is to be maintained when the clutch is opened as a function of at least one of ambient conditions of the motor vehicle or peripheral conditions of the motor vehicle.

2. The method as claimed in claim 1, further comprising determining the critical interference torque ($M_{crit}$) as a function of a coefficient of friction ($\mu$) of wheels of the motor vehicle.

3. The method as claimed in claim 2, wherein the coefficient of friction ($\mu$) is formed as a constant for a predefined range of an external temperature of the motor vehicle.

4. The method as claimed in claim 1, further comprising determining the critical interference torque ($M_{crit}$) as a function of a lateral acceleration of the motor vehicle.

5. The method as claimed in claim 1, further comprising when the critical interference torque ($M_{crit}$) is exceeded by a predefined torque, initiating vehicle movement dynamic adjustments for increasing the critical interference torque ($M_{crit}$) in order to ensure safety of the motor vehicle.

6. The method as claimed in claim 1, wherein information about at least one of the ambient conditions or the peripheral conditions of the motor vehicle is made available by the control device via a communication line of the motor vehicle.

7. The method as claimed in claim 1, wherein the safety distance of the open clutch is set based on a clutch characteristic curve taking into account information about the at least one of the ambient conditions or the peripheral conditions of the motor vehicle.

8. A method for avoiding safety-critical activation of a clutch in a hybrid module of a drivetrain of a motor vehicle, the drivetrain comprising an internal combustion engine, a hybrid module, a transmission, and a control device, the hybrid module is effective between the internal combustion engine and the transmission, and the hybrid module comprising:

(1) an electric drive;
(2) a clutch arranged to (a) frictionally lock the internal combustion engine, the electric drive, and the transmission to start the internal combustion engine; and (b) decouple the internal combustion engine from the electric drive and the transmission for purely electric travel; and,
(3) a freewheel arranged to transmit torque from the internal combustion engine to the transmission;

the method comprising:

providing the drivetrain; and via the control device, setting a critical interference torque ($M_{crit}$) associated with a closing of the clutch in order to set a safety distance which is to be maintained when the clutch is opened as a function of at least one of ambient conditions of the motor vehicle or peripheral conditions of the motor vehicle.

* * * * *